(12) United States Patent
Fox, Jr.

(10) Patent No.: US 11,465,760 B2
(45) Date of Patent: Oct. 11, 2022

(54) TENSIONED PARACHUTE RELEASE MECHANISM

(71) Applicant: Roy L. Fox, Jr., Belleville, WV (US)

(72) Inventor: Roy L. Fox, Jr., Belleville, WV (US)

( * ) Notice: Subject to any disclaimer, the term of this patent is extended or adjusted under 35 U.S.C. 154(b) by 0 days.

(21) Appl. No.: 17/518,083

(22) Filed: Nov. 3, 2021

(65) Prior Publication Data

US 2022/0135238 A1 May 5, 2022

Related U.S. Application Data

(60) Provisional application No. 63/109,409, filed on Nov. 4, 2020.

(51) Int. Cl.
*B64D 17/38* (2006.01)

(52) U.S. Cl.
CPC .................. *B64D 17/386* (2013.01)

(58) Field of Classification Search
CPC ...... B64D 17/52; B64D 17/46; B64D 17/386; B64D 17/64; B64C 2201/185
See application file for complete search history.

(56) References Cited

U.S. PATENT DOCUMENTS

| | | | | |
|---|---|---|---|---|
| 3,032,303 A * | 5/1962 | Hatfield | ................. | B64D 17/52 244/149 |
| 4,619,424 A * | 10/1986 | Twardawa | ............. | B64D 17/38 244/151 B |
| 5,687,931 A * | 11/1997 | Hogan | ................... | B64D 17/38 244/151 B |
| 7,264,205 B2 * | 9/2007 | Fox, Jr. | .................. | B64D 17/62 244/151 B |
| 8,033,507 B2 * | 10/2011 | Fox, Jr. | ................ | B64D 17/383 244/151 B |
| 8,313,063 B2 * | 11/2012 | Fox, Jr. | ................ | B64D 17/383 244/151 B |
| 9,056,678 B2 * | 6/2015 | Forsans | .................... | B64D 1/12 |
| 2011/0303793 A1 * | 12/2011 | Fox, Jr. | ................ | B64D 17/383 244/151 B |

* cited by examiner

*Primary Examiner* — Justin M Benedik

(74) *Attorney, Agent, or Firm* — Snell & Wilmer L.L.P.

(57) ABSTRACT

A parachute release mechanism includes a housing, a strap hinge pin pivotably mounted to the housing, a cord coupled to the housing, and a cord tensioner coupled to the housing and coupled to the cord, wherein the cord tensioner is configured to impart a desired tension to the cord. The strap hinge pin is pivotable between a secured position and a released position, wherein in the secured position the strap hinge pin is configured to support a suspension strap for a payload and in the released position the suspension strap is enabled to disengage from the strap hinge pin. The cord is configured to retain the strap hinge pin in the secured position.

19 Claims, 18 Drawing Sheets

TENSIONED PARACHUTE RELEASE MECHANISM

CROSS-REFERENCE TO RELATED APPLICATIONS

This application claims priority to, and the benefit of, U.S. Provisional Patent Application Ser. No. 63/109,409, entitled "TENSIONED PARACHUTE RELEASE MECHANISM," filed on Nov. 4, 2020. The '409 Applications is hereby incorporated by reference in its entirety for all purposes.

FIELD

The present disclosure relates to parachutes, particularly to systems and methods for releasing a deployed parachute from a suspended load in a controlled manner.

BACKGROUND

Aerial delivery is frequently used for transporting cargo quickly to areas of limited or hostile access, for example areas without the availability of nearby airports. At times, people in isolated areas, such as jungles, deserts, mountains, polar regions, combat zones, and the like are in need of essential supplies, including food and medical supplies, but are not within access to an airport at which a supply plane could land. In these instances, aerial delivery of cargo from in-flight aircraft may be the sole option. Aerial delivery systems involve the use of parachute systems to slow the descent and gently land the cargo platforms on the ground. Similar parachute systems are utilized for recovery of aeronautical and astronautical vehicles, including rocket boosters, experimental aircraft and space capsules, returning back to the earth's surface from flights in the upper atmosphere or outer space.

In these aerial delivery and/or recovery systems, a series of parachute deployments is often used to progressively slow the descent velocity of the payload. Use of a series of parachute deployments is often necessary because the force and impulse on the suspension lines and straps of a main parachute (i.e., a parachute large enough to slow the cargo platform to an acceptable landing velocity) deploying at the terminal, free-fall velocity of the cargo platform or vehicle would be excessive, causing the parachute system to fail. Instead, the payload is typically slowed in a series of stages using subsequently larger parachutes.

A drogue parachute is typically deployed first from the parachute system. The drogue is a small parachute which can be easily deployed from its container by a tether attached to the launching cargo plane, by an easily deployed stored energy means such as a spring launched pilot parachute, and/or the like. As the drogue parachute is deployed and inflated, it moderately decelerates the suspended cargo platform, as well as orienting the cargo platform into a desirable upright attitude, without excessive strain on the slings and parachute canopy from which the cargo platform is suspended. At a desired point, for example after a pre-determined time period, the drogue parachute is released from the suspended cargo platform. The drag provided by the released drogue parachute is then utilized to pull and deploy a next, larger parachute. This next parachute may be the main parachute, or another intermediary parachute prior to another subsequent deployment of the main parachute, depending upon the size of the cargo platform and the design of the parachute system.

To accomplish this release, a drogue parachute and/or intermediary parachute is typically attached to the suspended cargo platform by a release mechanism. The suspended cargo platform is suspended from the release mechanism, typically by a series of suspension slings. The suspension slings help maintain the suspended cargo platform in a stable, level attitude. The number of suspension slings is often four, with one routed to each corner of a square or rectangular cargo platform supporting the suspended cargo. For larger platforms, a greater number of suspension slings may be used. The suspension slings may converge at a point above the suspended load to the release mechanism, located at the apex of a pyramid formed by the suspension slings. The drogue parachute and/or intermediary parachute is often attached to the release mechanism by a single sling or riser. From the top end of this sling, a number of suspension lines radiate to the perimeter of the drogue parachute and/or intermediary parachute canopy.

Moreover, some parachute release mechanisms utilize a cord or other restraint to hold other components, such as one or more latch plates, in a secured position prior to release. If such cords are not properly tensioned, the parachute release mechanism may be susceptible to premature or inadvertent release. Accordingly, improved release mechanisms remain desirable.

SUMMARY

A parachute release mechanism is disclosed, comprising a housing, a strap hinge pin pivotably mounted to the housing, the strap hinge pin pivotable between a secured position and a released position, wherein in the secured position the strap hinge pin is configured to support a suspension strap for a payload and in the released position the suspension strap is enabled to disengage from the strap hinge pin, a cord coupled to the housing, the cord configured to retain the strap hinge pin in the secured position, and a cord tensioner coupled to the housing and coupled to the cord, wherein the cord tensioner is configured to impart a desired tension to the cord.

In various embodiments, the cord is configured to be severed by a cord cutting device, wherein in response to the cord being severed the strap hinge pin is configured to transition from the secured position to the released position. In various embodiments, the parachute release mechanism further comprises the cord cutting device mounted to the housing. In various embodiments, the parachute release mechanism further comprises a latch plate pivotably mounted to the housing, wherein the cord is configured to at least one of extend around and extend through the latch plate to restrict pivoting movement of the latch plate, thereby securing the strap hinge pin in the secured position. In various embodiments, the latch plate is an outer latch plate and the release mechanism further comprises an inner latch plate pivotably mounted to the housing against which a free end of the strap hinge pin is engaged in the secured position.

In various embodiments, the cord extends through an aperture defined in a free end of the outer latch plate and/or extends around a surface (e.g., a slot) of the free end of the outer latch plate. In various embodiments, the cord extends over a hinge point of the inner latch plate. In various embodiments, the cord tensioner is mounted to the outer latch plate. In various embodiments, the cord tensioner is mounted to a front plate of the parachute release mechanism and the cord extends through an aperture defined in the front plate and around a portion (e.g., an orifice and/or a slot) of the outer latch plate. In various embodiments, the cord tensioner comprises a draw block coupled to the housing, a tensioning screw extending through the draw block to which the cord is attached, and a pair of nuts threadably engaged on the tensioning screw on opposite sides of the draw block.

In various embodiments, the pair of nuts comprises a tensioning nut on a bottom side of the draw block and a lock nut on a top side of the draw block. In various embodiments, the tensioning nut is configured to be rotated relative to the tensioning screw to tension the cord and the lock nut is configured to secure the tensioning screw in response to the desired tension being imparted to the cord. In various embodiments, the cord tensioner comprises at turnbuckle assembly. In various embodiments, the cord tensioner comprises a capstan winch.

A method of connecting a parachute to a payload is disclosed, the method comprising coupling the parachute to a housing of a parachute release mechanism, coupling the payload to a suspension strap, engaging the suspension strap around a strap hinge pin of the parachute release mechanism, and securing the strap hinge pin in a secured position using a cord, wherein securing the strap hinge pin comprises tensioning the cord to a desired tension.

In various embodiments, securing the strap hinge pin comprises routing the cord around or through at least one latch plate of the parachute release mechanism. In various embodiments, securing the strap hinge pin comprises engaging a free end of the strap hinge pin against the at least one latch plate. In various embodiments, securing the strap hinge pin comprises routing the cord around or through at least one latch plate of the parachute release mechanism such that the at least one latch plate accommodates one or more sections of the cord to extend between the housing and the at least one latch plate.

A method of using a parachute release mechanism is disclosed, the method comprising coupling a parachute to a parachute release mechanism, coupling a payload to the parachute release mechanism, tensioning a cord of the parachute release mechanism to apply a retaining force that prevents rotation of an inner latch plate and an outer latch plate of the parachute release mechanism, deploying the payload from an aircraft, deploying the parachute, and activating the parachute release mechanism by severing the cord to separate the parachute from the payload.

In various embodiments, the inner latch plate and the outer latch plate rotate in response to the cord being severed to separate the parachute from the payload.

The contents of this summary section are provided only as a simplified introduction to the disclosure and are not intended to be used to limit the scope of the appended claims.

BRIEF DESCRIPTION OF THE DRAWINGS

In order that the advantages of the disclosure will be readily understood, a more particular description of the disclosure is rendered by reference to the appended drawings. Thus, although the subject matter of the present disclosure is particularly pointed out and distinctly claimed in the concluding portion of the specification, a more complete understanding of the present disclosure, may best be obtained by referring to the detailed description and claims when considered in connection with the drawing figures. Understanding that these drawings depict only typical embodiments of the disclosure and are not therefore to be considered to be limiting of its scope, the subject matter of the present application will be described and explained with additional specificity and detail through the use of the accompanying drawings, in which:

DETAILED DESCRIPTION

Figure 1A:
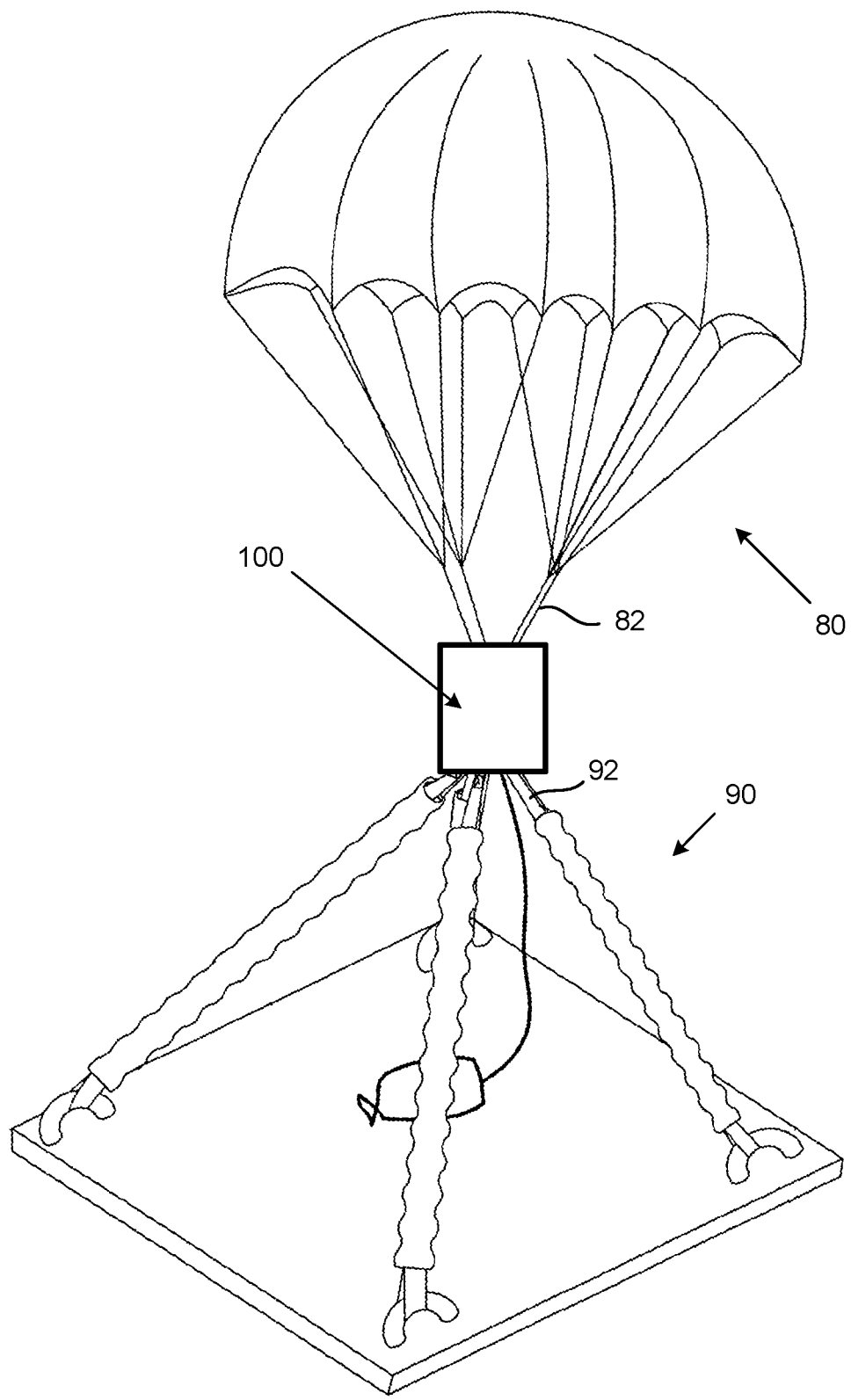
FIG. 1A is a schematic perspective view of a parachute release mechanism interconnected between a parachute and a payload, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, the terms "including," "comprising," "having," and variations thereof mean "including but not limited to" unless expressly specified otherwise. Accordingly, the terms "including," "comprising," "having," and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all of the items are mutually exclusive and/or mutually inclusive, unless expressly specified otherwise.

Further, in the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Thus, when a particular feature, structure, or characteristic is described in connection with an embodiment, it is submitted that it is within the knowledge of one skilled in the art to affect such feature, structure, or characteristic in connection with other embodiments whether or not explicitly described. Similarly, the use of the term "implementation" means an implementation having a particular feature, structure, or characteristic described in connection with one or more embodiments of the present disclosure. Absent an express correlation to indicate otherwise, an implementation may be associated with one or more embodiments. After reading the description, it will be apparent to one skilled in the relevant art(s) how to implement the disclosure in alternative embodiments.

For the sake of brevity, conventional techniques for parachute construction, deployment, reefing, disreefing, release, recovery, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical parachute release system.

In a parachute and/or parachute release system, it is often desirable to avoid concentrated masses. Thus, it would typically be desirable to allow a particular parachute release system to support an increased payload size without a corresponding increase in the mass of the parachute release system. Correspondingly, it would be generally desirable to allow a reduction in the mass of a particular parachute release system needed to support a given payload size. In accordance with various exemplary embodiments, a parachute release system may be configured with various components and structures in order to achieve a reduced mass and/or increased supported payload size. Moreover, an exemplary parachute release system may also be configured with various components and structures in order to improve reliability and/or controllability when a parachute is released from a payload.

A parachute release system may be any system configured to facilitate controlled separation of a parachute from a payload. In accordance with various embodiments, and with reference to FIG. 1A, a parachute release system generally includes a parachute release mechanism 100, which in use is interconnected between a parachute 80 and a payload 90. That is, a parachute release mechanism 100, as defined herein, generally refers to an apparatus or device disposed between the parachute 80 and the payload 90 to enable the payload 90 to be disconnected (e.g., released) from the parachute 80. Accordingly, parachute release mechanism 100 may interface with parachute risers 82 and payload suspension straps 92, as described in greater detail below. Thus, parachute release mechanism 100 provided herein is configured to releasably couple a parachute 80 to a payload 90, according to various embodiments. More generally, parachute release mechanism 100 may be utilized to releasable couple a first object to a second object.

Figure 1B:
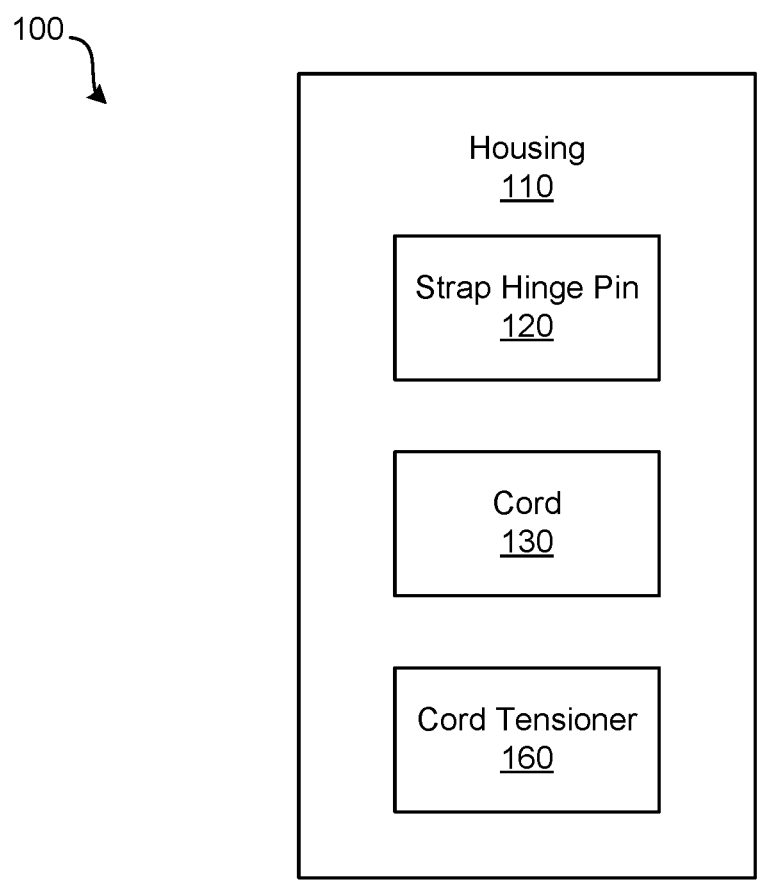
FIG. 1B is a schematic block diagram of a parachute release mechanism, in accordance with various embodiments.

In various embodiments, and with reference now to FIG. 1B, parachute release mechanism 100 generally includes a housing 110 and a strap hinge pin 120 pivotably mounted to the housing 110. One or more payload suspension straps 92 may be supported by the strap hinge pin 120, and parachute release mechanism 100 may also include a cord 130 configured to retain the strap hinge pin 120 in a secured position to retain the payload connected to parachute release mechanism 100. As described in greater detail below, parachute release mechanism 100 may include a cord tensioner 160 that is generally configured to impart a desired tension or range of tensions to the cord 130, thereby improving the repeatability and reliability of assembling the mechanism 100 and otherwise generally mitigating the risk of premature or inadvertent release of the payload 90.

Figure 1C:
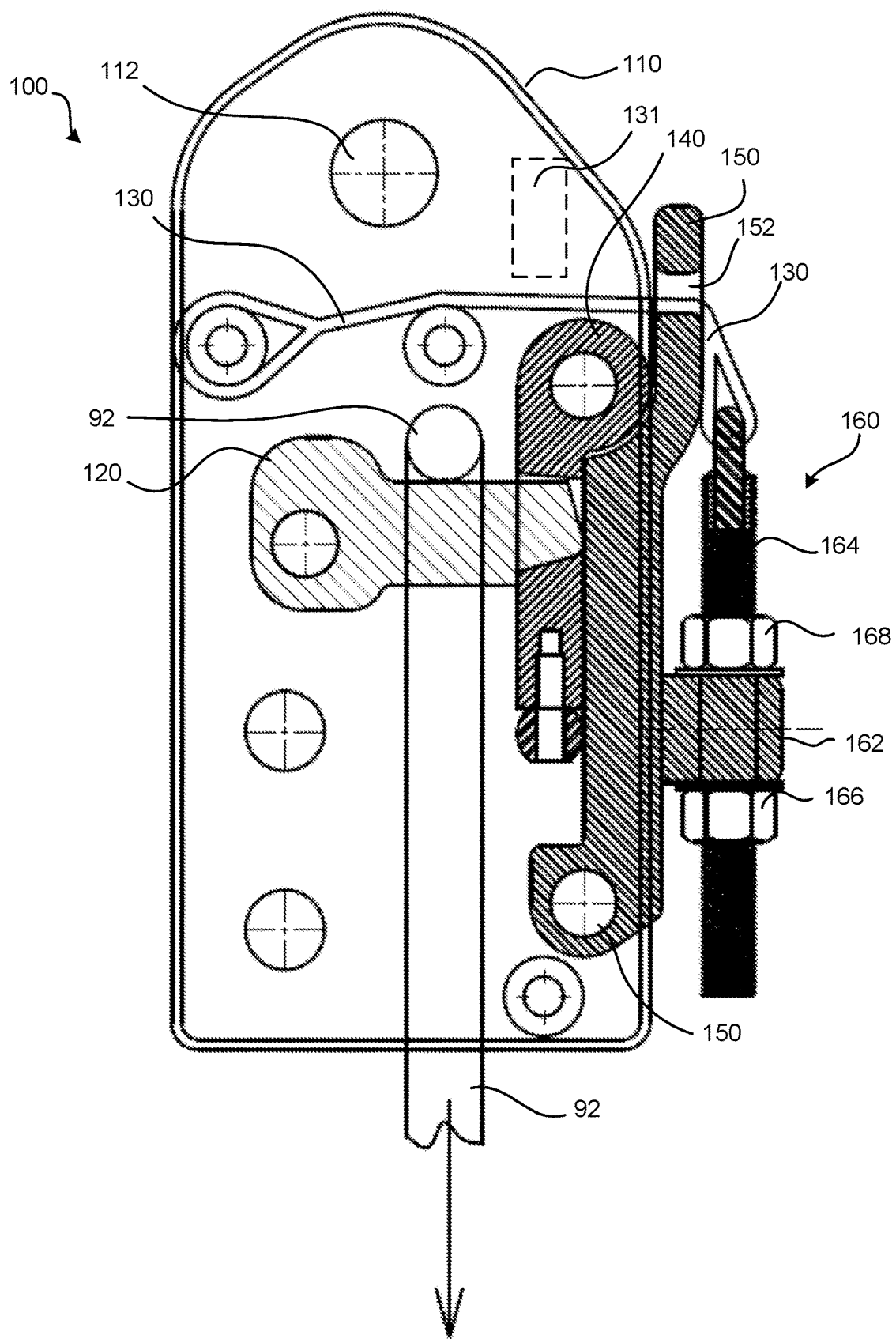
FIG. 1C is a cross-sectional schematic view of a parachute release mechanism, in accordance with various embodiments.

In various embodiments, and with reference now to FIG. 1C, exemplary details of a physical implementation of parachute release mechanism 100 are provided. The housing 110 of parachute release mechanism 100 includes the components that provide the base structure of the assembly. For example, the housing 110 may include a front plate and a back plate (not shown in the cross-sectional view of FIG. 1C) that define the overall body of the mechanism. The front plate and the back plate may be coupled together using various fasteners, such as bolts. The housing 110 may generally define a compartment within which (or at least partially within which) various components are disposed. In various embodiments, parachute release mechanism 100 includes a strap hinge pin 120, a cord 130, at least one latch plate 140/150, and a cord tensioner 160. The risers 82 of the parachute 80 may be coupled to an anchor point 112 and the suspension strap(s) 92 of the payload may be supported on the strap hinge pin 120. Parachute release mechanism 100 may also include a cord cutting device 131, which is shown schematically in FIG. 1C. Each of these components of parachute release mechanism 100 are described in greater detail below.

The portions of the housing 110, such as the inner and outer main plates, may comprise metal (e.g., aluminum, steel, titanium, magnesium, and the like, and/or alloys and combinations of the same), plastic, composite, or any other suitable material configured to provide structural support to parachute release mechanism 100. The inner and outer main plates may define inside and outside surfaces of parachute release mechanism 100, and each of these plates may have a generally planar structure. The main plates may be in a parallel arrangement, and may define multiple holes therethrough. One or more fasteners, such as high-strength bolts, may extend through these holes to interconnect the two main plates together. For example, the main plates may be coupled together using bolts, nuts, washers, and/or spacers. The housing 110 may include various interior walls and/or plates that define a plurality of interior regions, with each region having associated components to enable securement and release of suspension straps, thereby enabling the housing 110 to be implemented to release multiple sets of suspension straps 92.

Figure 2A:
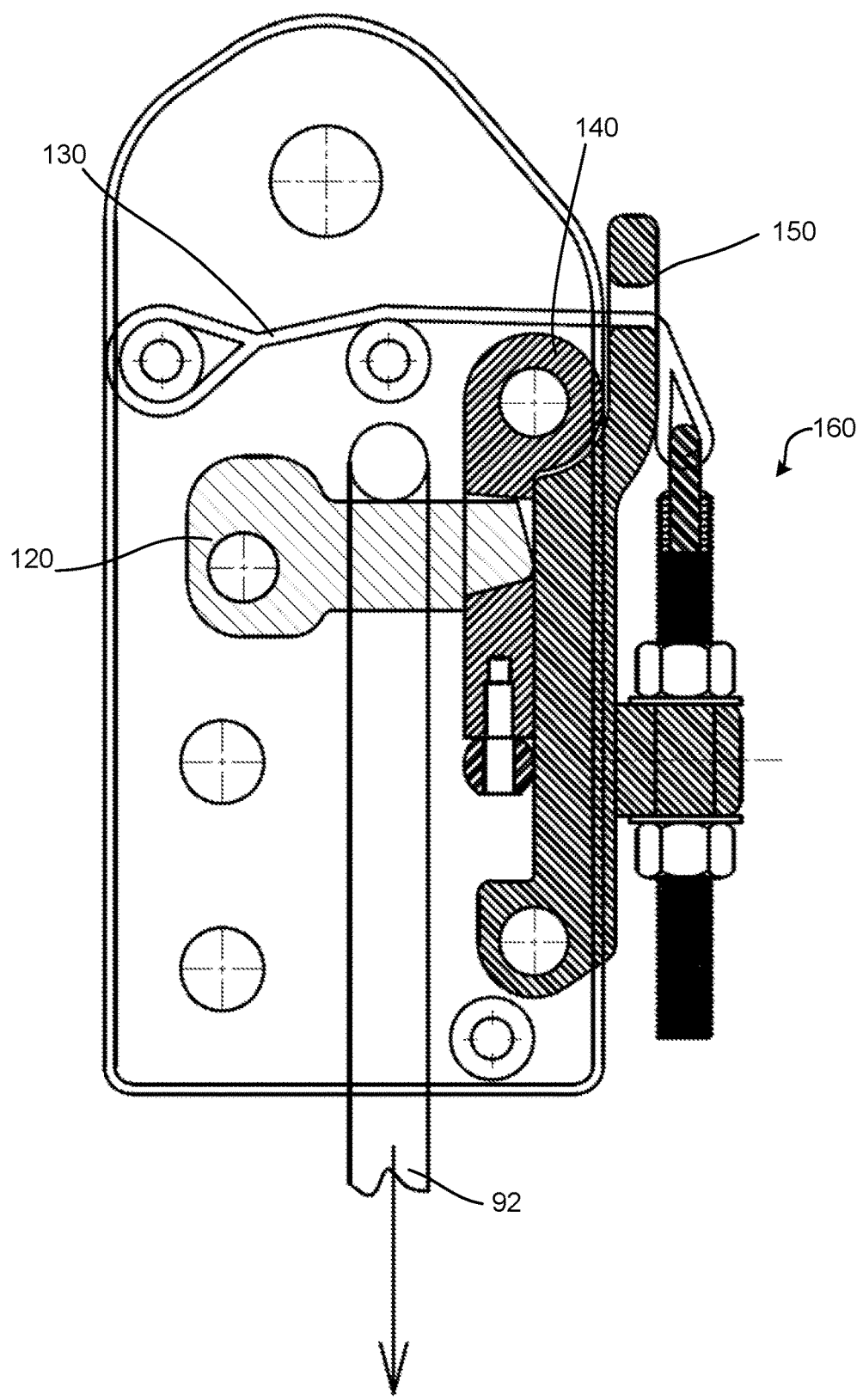
FIGS. 2A-2F illustrate progressive stages of releasing a payload utilizing a parachute release mechanism, in accordance with various embodiments.
Figure 2B:
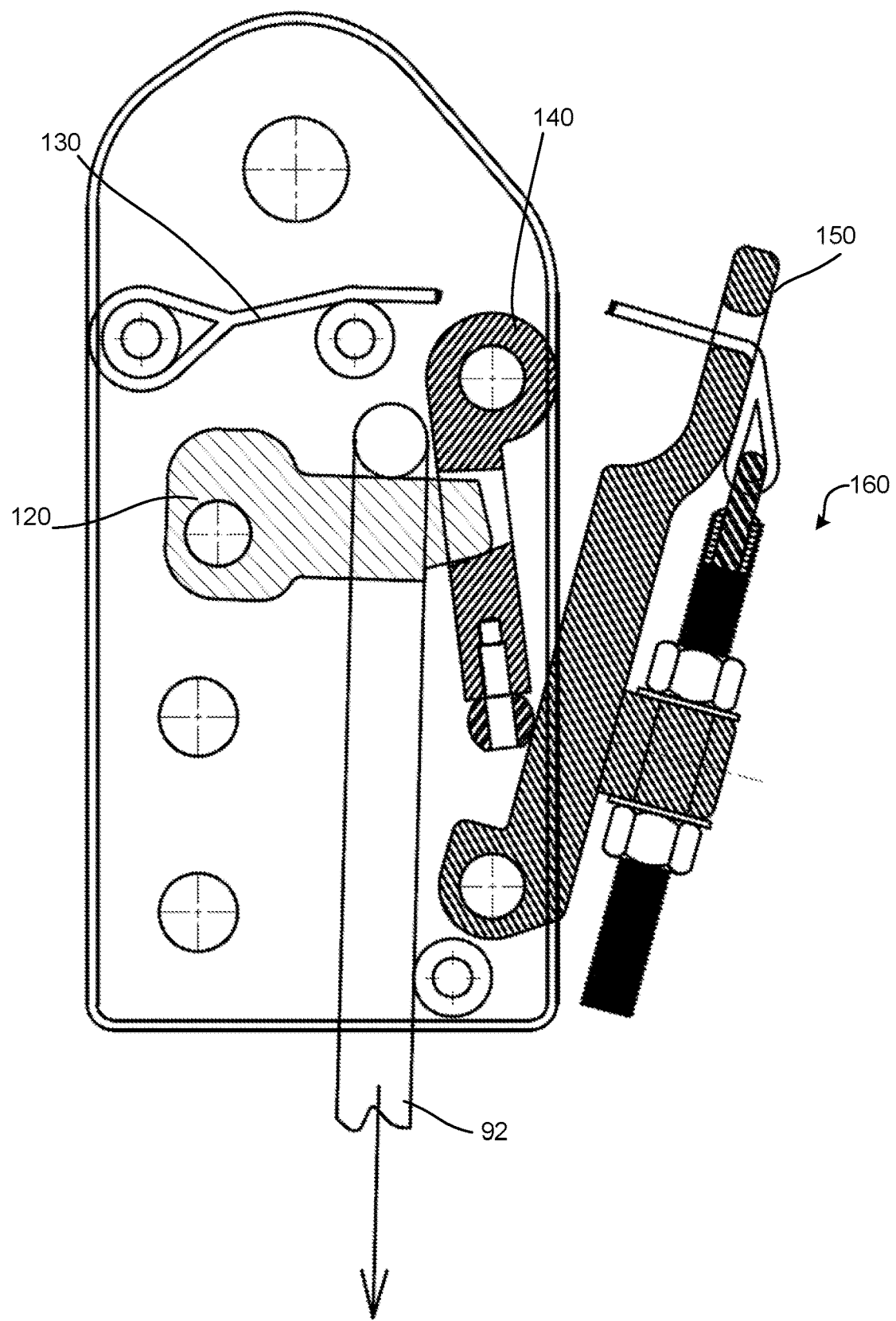
Figure 2C:
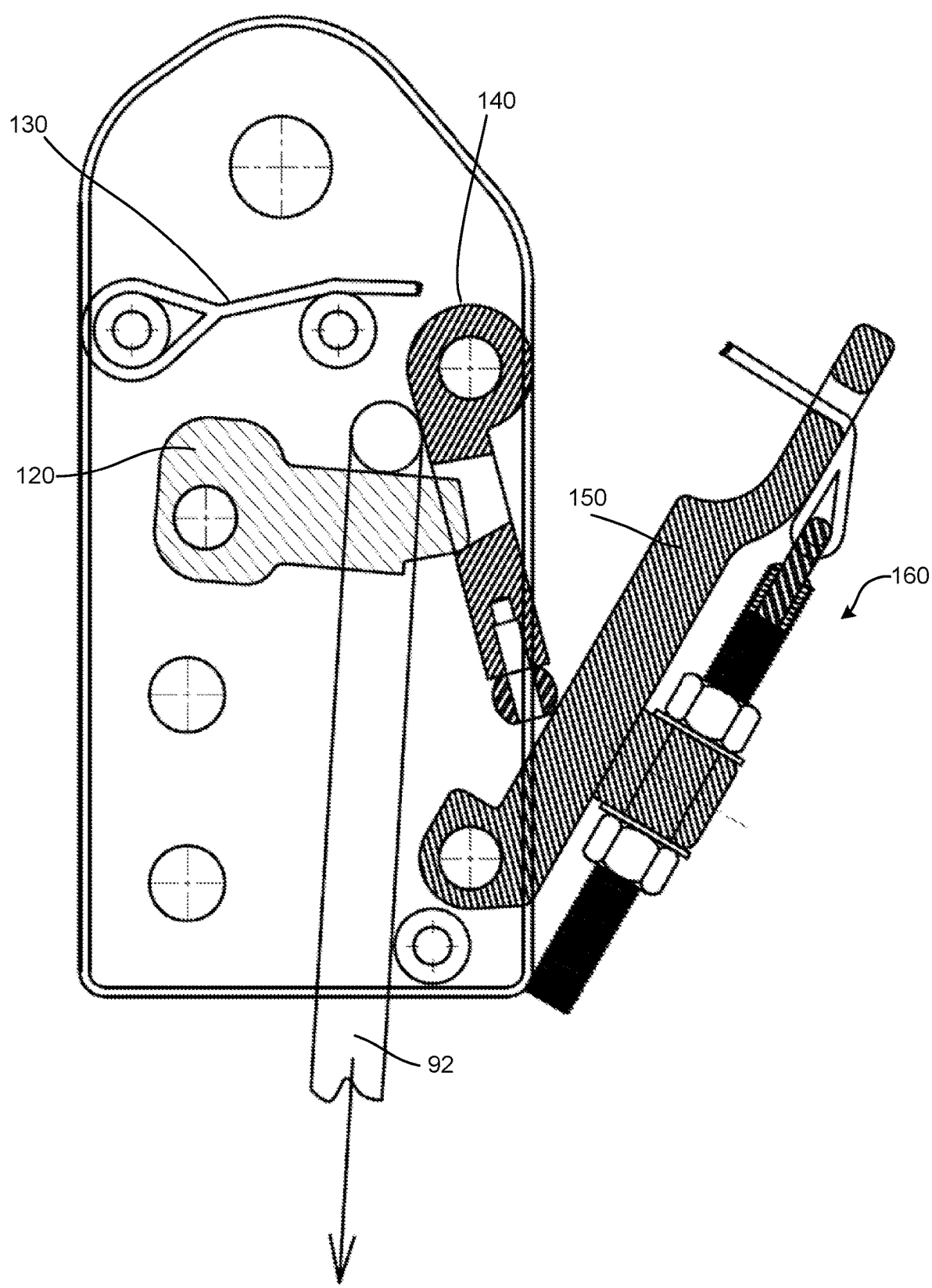
Figure 2D:
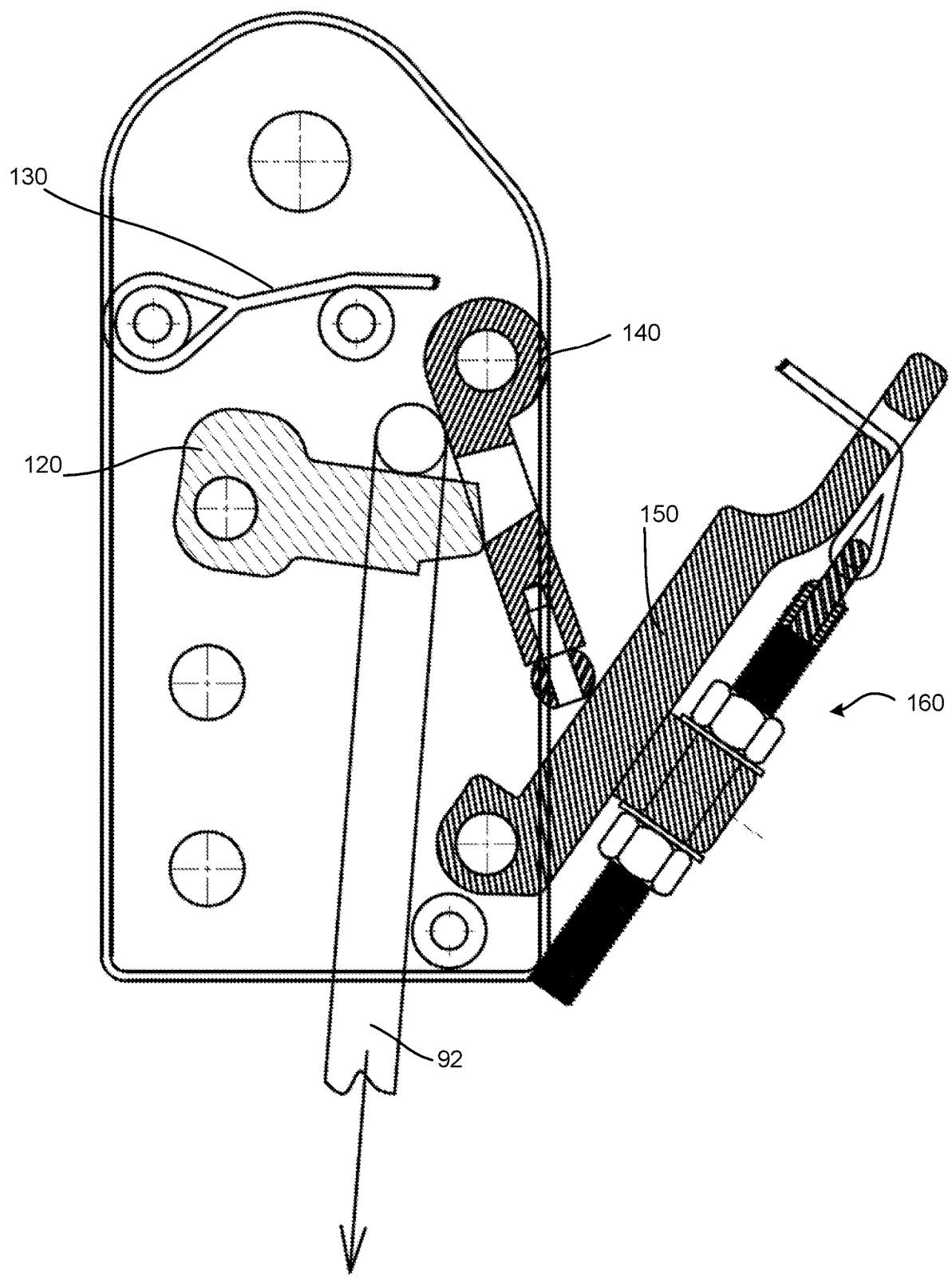
Figure 2E:
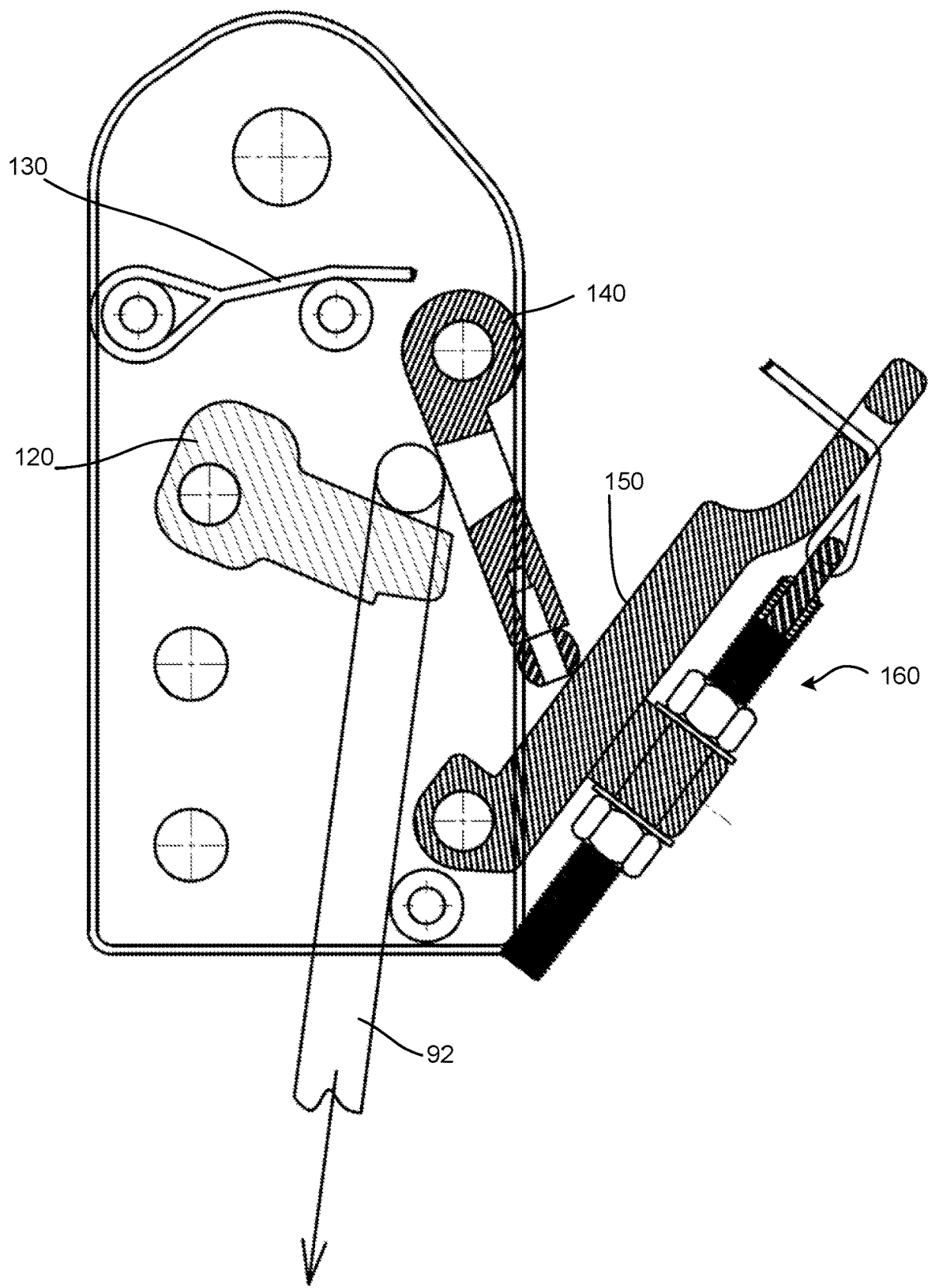
Figure 2F:
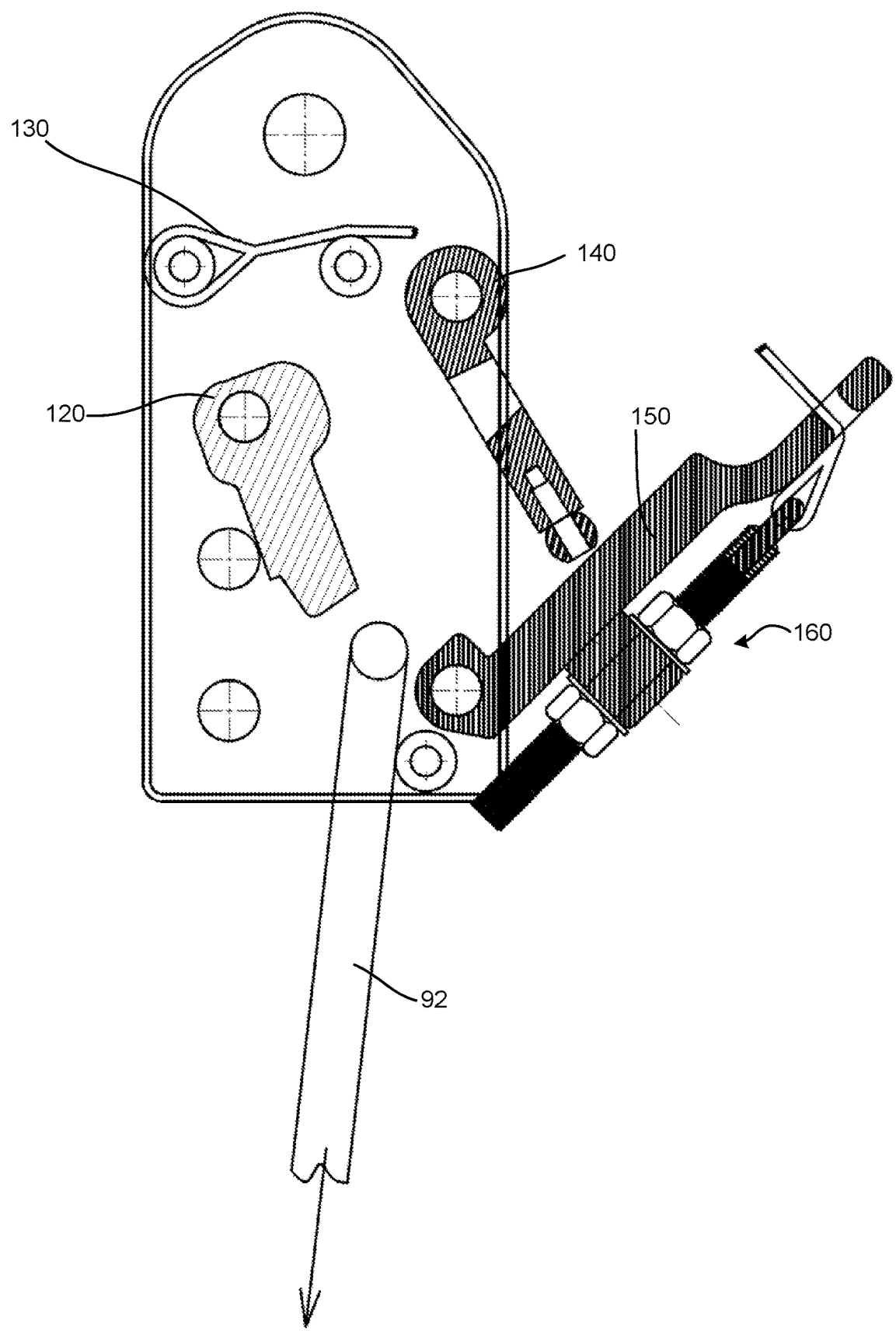

In various embodiments, the strap hinge pin 120 is pivotably mounted to the housing 110, with the strap hinge pin 120 being pivotable between a secured position (e.g., as illustrated in FIGS. 1C and 2A) and a released position (e.g., as illustrated in FIG. 2F). In the secured position the strap hinge pin 120 is configured to support a suspension strap 92 for a payload 90 and in the released position the suspension strap 92 is enabled to disengage from the strap hinge pin 120. The cord 130 may be anchored at one end to the housing 110 and the opposing end may be coupled to the cord tensioner 160. The cord may be configured to retain the strap hinge pin 120 in the secured position. The cord 130 may be severable, and thus in response to the cord 130 being severed by a cord cutting device 131, the strap hinge pin 120 may transition from the secured position to the released position. As described in greater detail below, the cord tensioner 160 is actuatable by a user to impart a desired tension to the cord 130, according to various embodiments.

In various embodiments, parachute release mechanism 100 further includes one or more latch plates pivotably mounted to the housing 110. The cord 130 may be configured to extend around and/or extend through the one or more latch plates to restrict pivoting movement of the latch plate, thereby securing the strap hinge pin 120 in the secured position. Said differently, parachute release mechanism 100 may include an inner latch plate 140 and an outer latch plate 150 that are both pivotably mounted to the housing 110. A free end of the pivotable strap hinge pin 120 may be engaged against the inner latch plate 140 in the secured position. Accordingly, moving the strap hinge pin 120 to the released position may be enabled by outward pivoting rotation of the inner latch plate 140 and the outer latch plate 150. The cord 130, as mentioned above, may be routed around or through one or both of the latch plates 140/150 to prevent this releasing pivoting motion until cord 130 is severed (or otherwise released or removed).

In various embodiments, the cord 130 extends through an aperture 152 (and/or a slot, such as slot 653 with momentary reference to FIG. 6B) defined in a free end of the outer latch plate 150. In various embodiments, the cord 130 extends over a hinge point of the inner latch plate 140. In such a configuration, the cord 130 has one end mounted within the compartment defined by the housing 110 and the other end of the cord 130 is coupled to the cord tensioner 160, with the body of the cord 130 being routed around the latch plates 140/150 to hold them in a desired orientation to lock the strap hinge pin 120 in the secured position.

With continued reference to FIG. 1C, the inner latch plate 140 may define a cavity or a recess configured to releasably receive a portion (e.g., a free end/tip) of the strap hinge pin 120. As mentioned above, the strap hinge pin 120 and the latch plates 140/150 may comprise metal (e.g., aluminum, steel, titanium, magnesium, and the like, and/or alloys and combinations of the same), plastic, composite, or any other suitable material.

In various embodiments, and with reference now to FIGS. 2A-2F, parachute release mechanism 100 may be operated in order to release a parachute from a payload. As mentioned above, suspension strap(s) 92 of the payload may be supported around the strap hinge pin 120 in the secured position (FIG. 2A). The cord 130 may be severed by a cord cutting device mounted to the housing, such as a reefing cutter, an explosive bolt, and/or any other suitable method and/or mechanism. With reference now to FIGS. 2B-2F, due to gravity and/or the off-plane center of balance of the strap hinge pin 120 relative to the inner latch plate 140, the strap hinge pin 120 is pulled downward, thereby causing a resultant outward pivoting rotation of the latch plates 140/150, which are no longer secured because of the severed cord 130. Said differently, the inner latch plate 140 at least partially rotates, and is thus separated from the strap hinge pin 120 to allow the strap hinge pin 120 to rotate downward and enable suspension strap(s) 92 to slide off strap hinge pin 120.

As mentioned above in the background section, if the cord is not properly tensioned, the latch plates may not be sufficiently retained and the parachute release mechanism may prematurely or inadvertently release the payload from the parachute. For example, in a conventional configuration, the cord may be manually affixed to the assembly by a user, and variations in the manner and method of connecting the cord to the mechanism, for example caused by different users or different types of cord materials, could potentially result in non-uniform cord tension. This non-uniformity of the cord tension may cause issues as serious as premature or inadvertent release of the payload, or may adversely affect the ability of a controller to precisely and controllably initiate the release of the payload.

Accordingly, as mentioned above and now with reference to FIGS. 1C and 3A-3C, the cord tensioner 160 to which one end of the cord 130 is coupled is configured to impart a desired tension or range of tensions to the cord 130, thereby improving the consistency and reliability of the method of installing the cord 130. In various embodiments, the cord tensioner 160 is generally coupled to the housing 110. For example, and with specific reference to FIG. 1C, the cord tensioner 160 may be mounted to the outer latch plate 150.

Figure 3A:
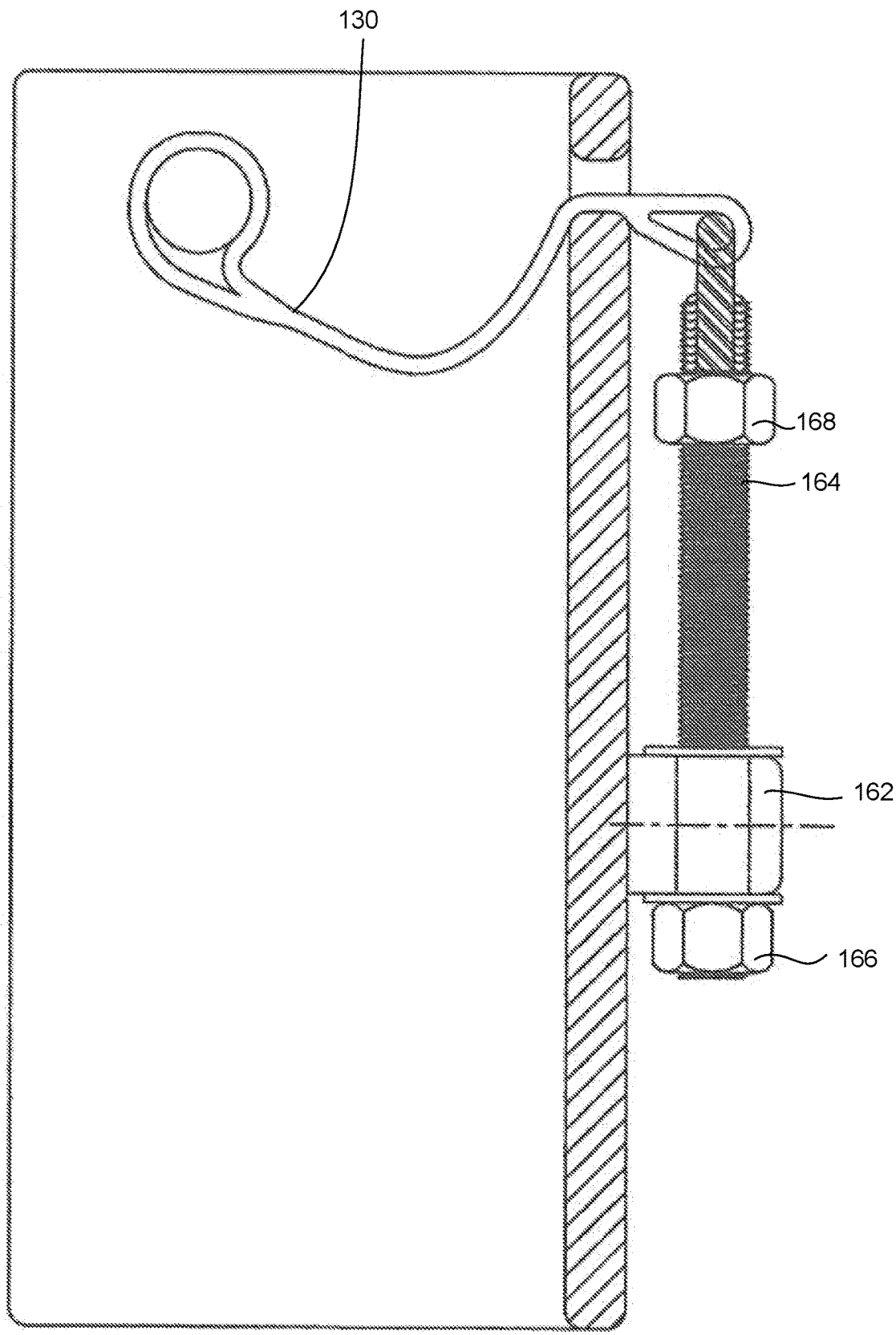
FIGS. 3A-3C illustrate a method of tensioning a cord of a parachute release mechanism, in accordance with various embodiments.
Figure 3B:
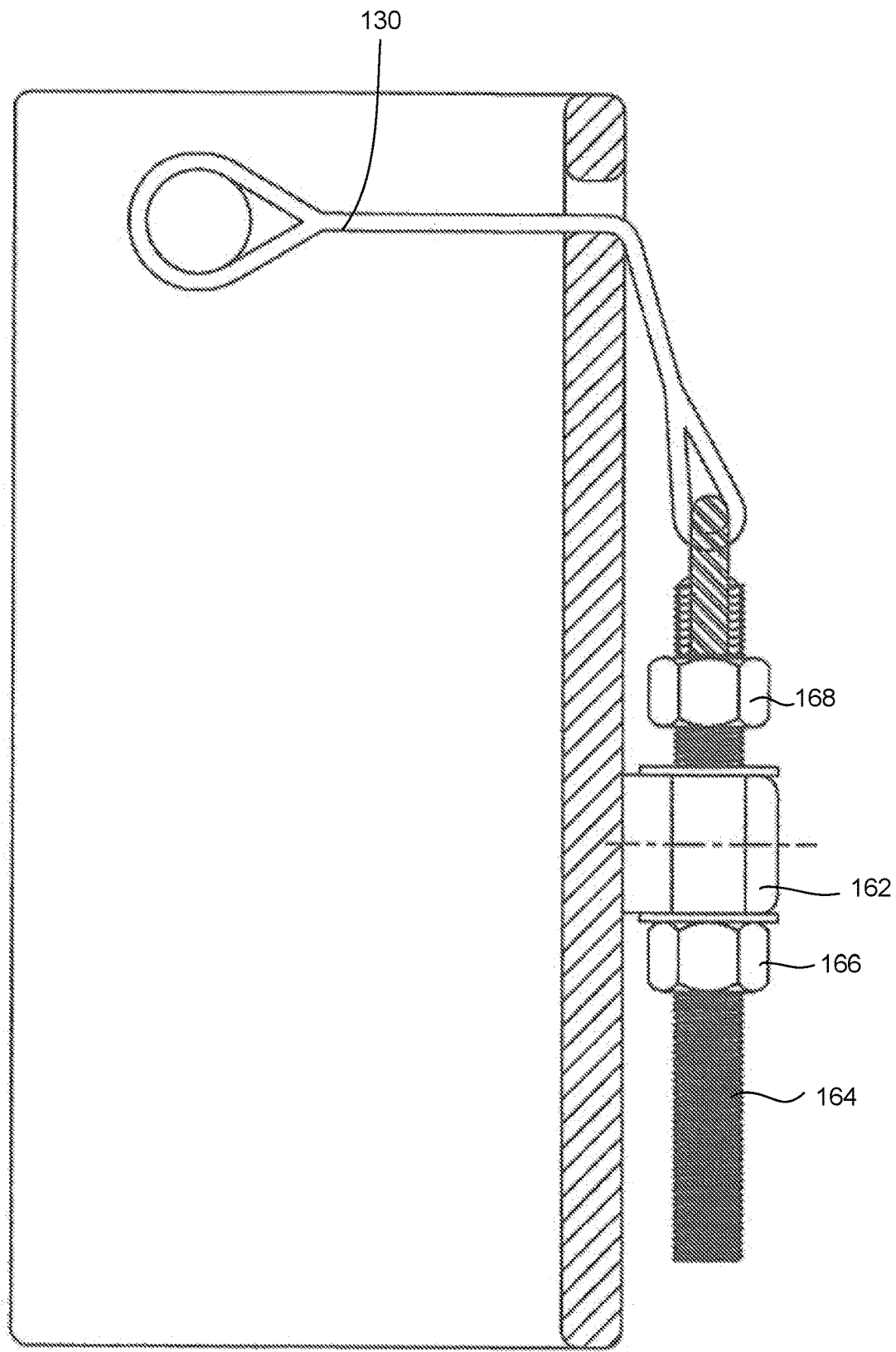
Figure 3C:
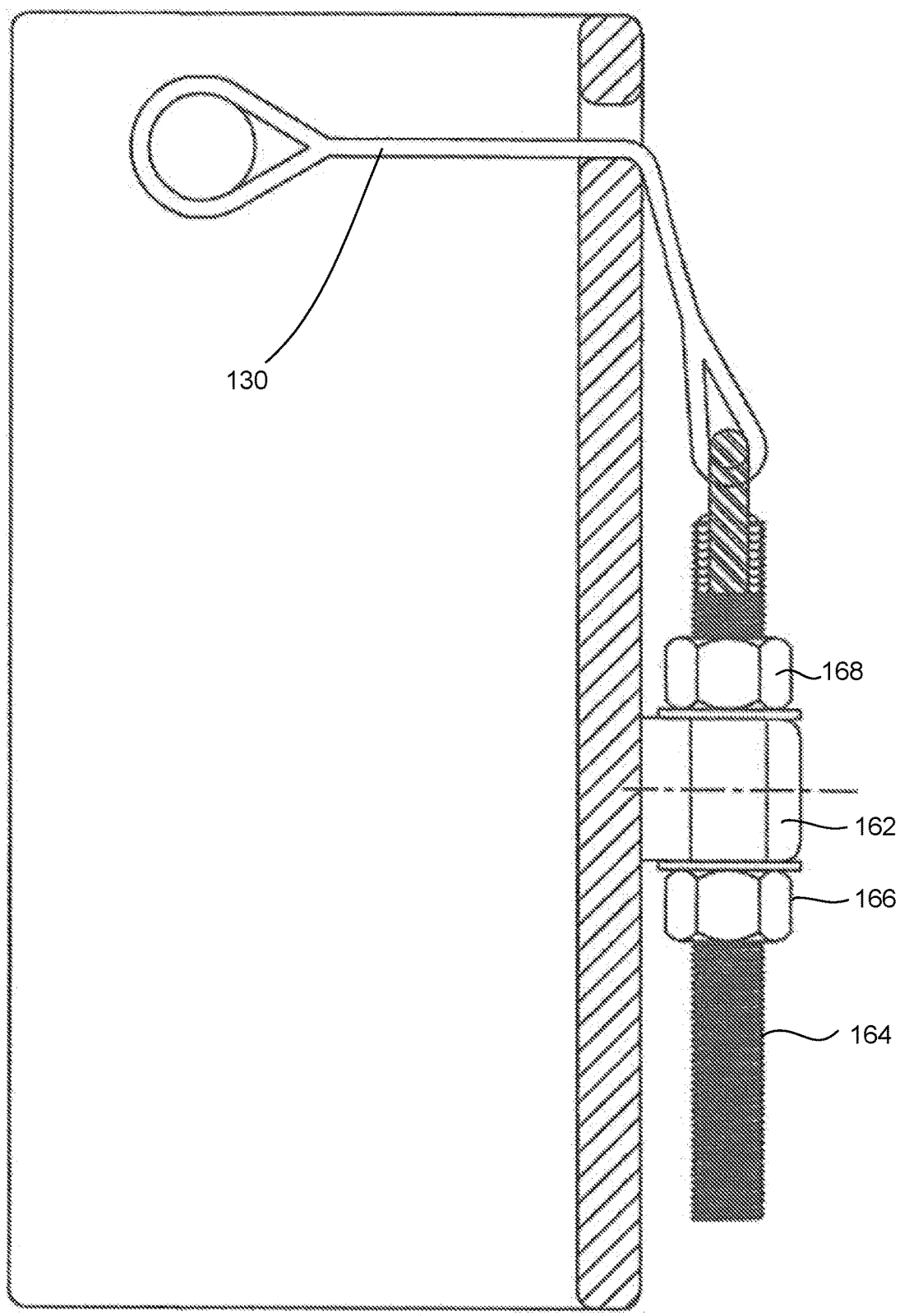

The cord tensioner 160 may be one of various tensioning mechanisms. That is, the cord tensioner 160 may be a tensioning screw assembly, a turnbuckle assembly, a capstan winch, a spring-loaded tensioning assembly, or other suitable tensioning component or system. For example, the cord tensioner 160 may include a draw block 162 coupled to the housing (e.g., mounted to the outer latch plate 150), with a tensioning screw 164 extending through the draw block 162. The cord 130 may be attached to the tensioning screw 164, and a pair of nuts 166, 168 may be threadably engaged on the tensioning screw 164 on opposite sides of the draw block 162. That is, the pair of nuts may be a tensioning nut 166 on a bottom side of the draw block and a lock nut 168 on a top side of the draw block 162. With the cord 130 attached to the tensioning screw 164 (FIG. 3A), the tensioning nut 166 may be rotated relative to the tensioning screw 164 to draw the tensioning screw 164 downward through the draw block 162 to tension the cord 130 (FIG. 3B). In response to a proper tension being imparted to the cord 130, the lock nut 168 may be rotated relative to the tensioning screw 164 to secure the tensioning screw 164 in place (FIG. 3C). Moreover, cord 130 may be selected and tensioned in a manner tailored for various payloads. For example, when parachute release mechanism 100 is utilized with a payload of about 200 pounds, a cord 130 having a tensile strength of about 1000 pounds may be utilized, and cord tensioner 160 may be operable to apply a torque load to cord 130 of between about 110 inch-pounds and about 130 inch-pounds. In another example, when parachute release mechanism 100 is utilized for a payload in the range of about 42,000 pounds, cord 130 may be configured as multiple strands, each strand having a tensile strength of about 4000 pounds, and cord tensioner 160 may be operable to apply a torque load to cord 130 of between about 25 foot-pounds and 30 foot-pounds.

Figure 4A:
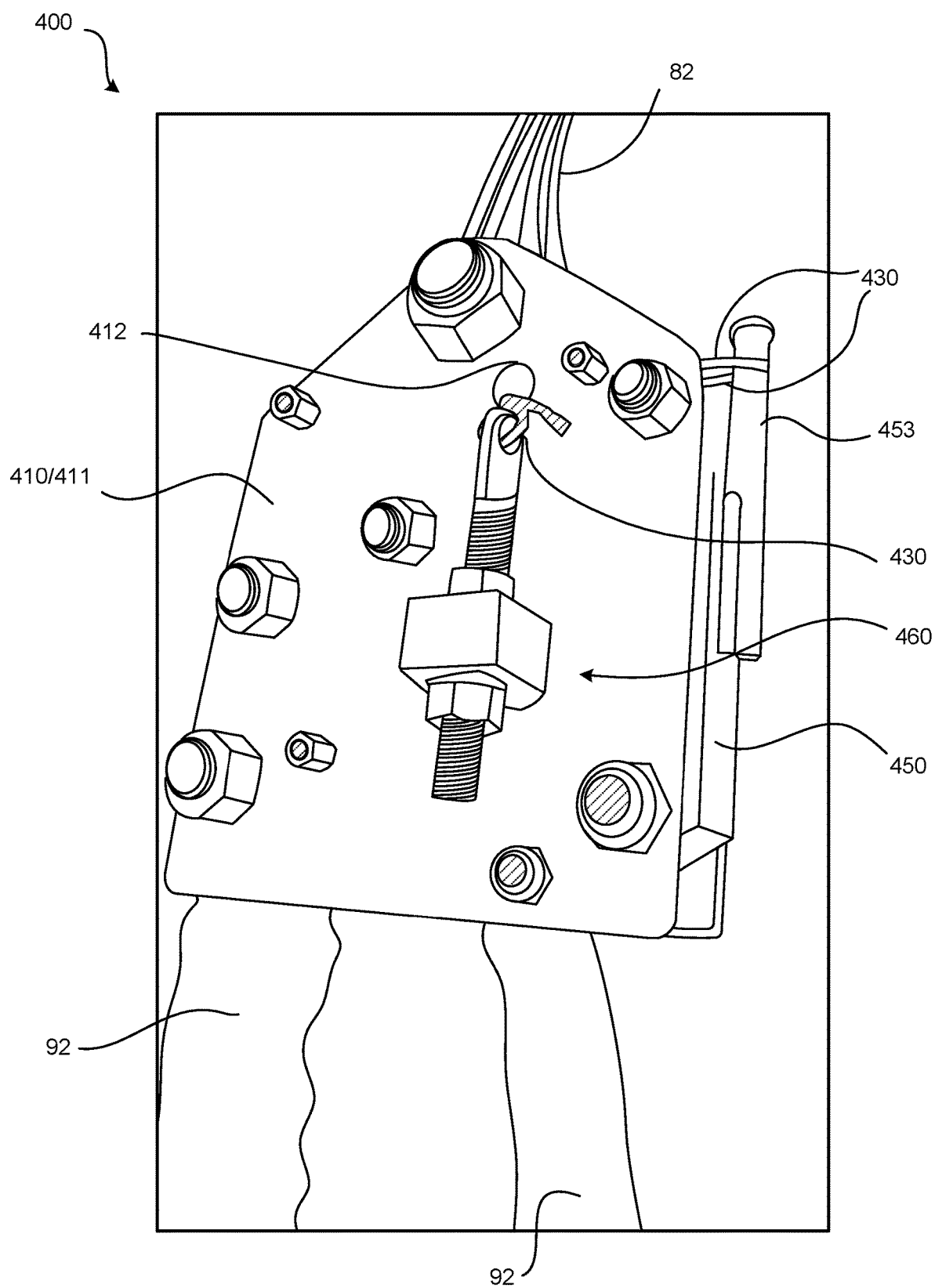
FIG. 4A is a perspective front view of another implementation of a parachute release mechanism, in accordance with various embodiments.
Figure 4B:
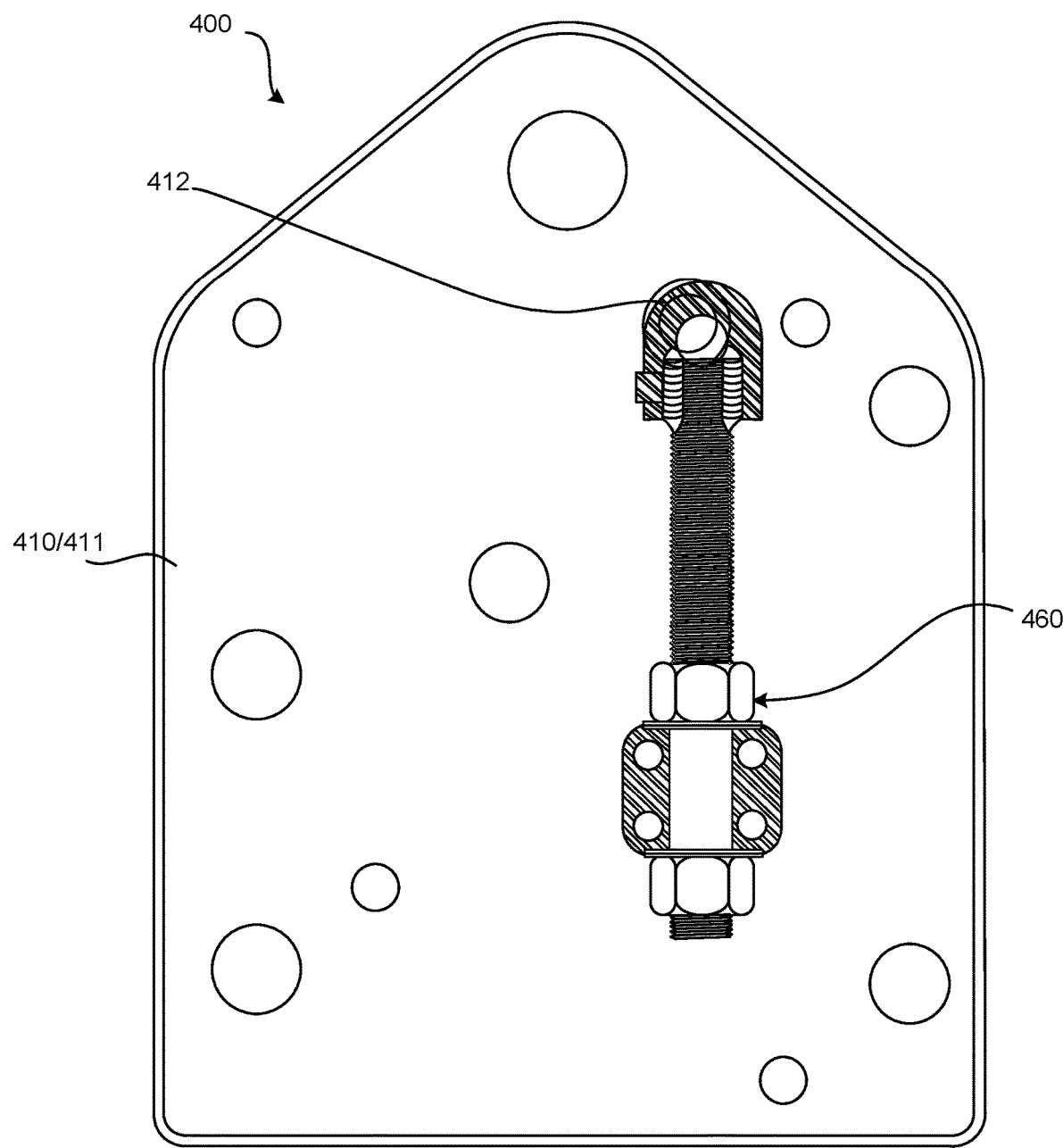
FIG. 4B is a front view of a portion of the parachute release mechanism implementation of FIG. 4A with isolated details of the cord tensioner, in accordance with various embodiments.
Figure 4C:
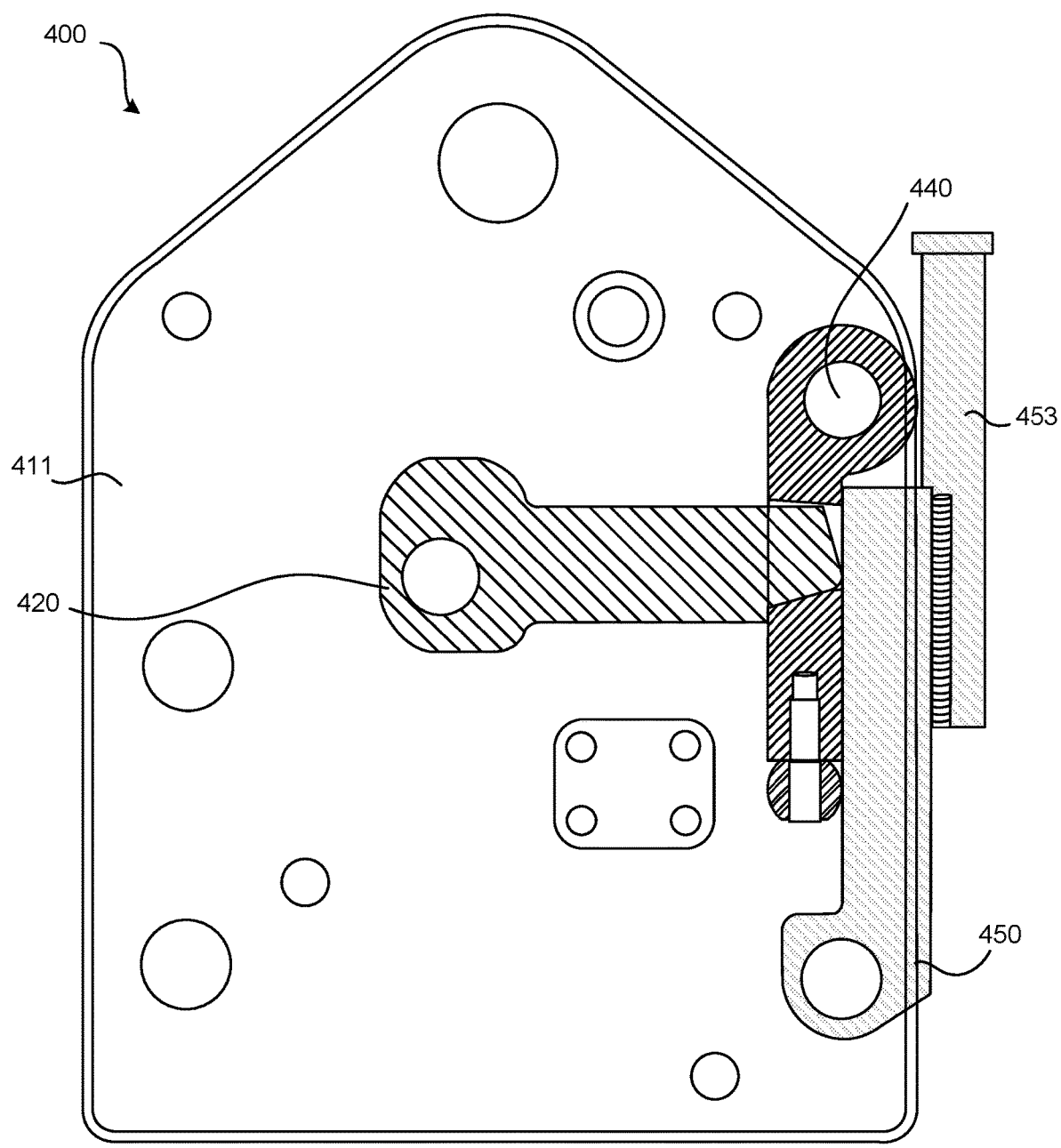
FIG. 4C is a front view of a portion of the parachute release mechanism implementation of FIG. 4A with the front main plate removed and isolated details of the internal components, in accordance with various embodiments.

In various embodiments, and with reference now to FIG. 4A through FIG. 4C, an alternative implementation of a parachute release mechanism 400 is provided. That is, the cord tensioner 460 may be mounted to a front or back main plate 411 of the housing 410. In such a configuration, the main plate 411 defines an aperture/hole 412 through which the cord 430 is routed. The cord 130 may be routed from the aperture/hole 412 around a portion 453 of the outer latch plate 450 and back in to an anchoring point within the chamber defined by the housing 410. In such a configuration, the cord tensioner 460 is not mounted directly to one of the moveable latch plates, but instead is mounted to one of the main plates that define the structure of the housing 410. With particular focus on FIG. 4C, inner latch plate 440 and outer latch plate 450 may both be pivotably mounted to the back main plate 411. In various embodiments, inner latch plate 440 and outer latch plate 450 may pivot in opposite rotational directions to release a payload.

Figure 5:
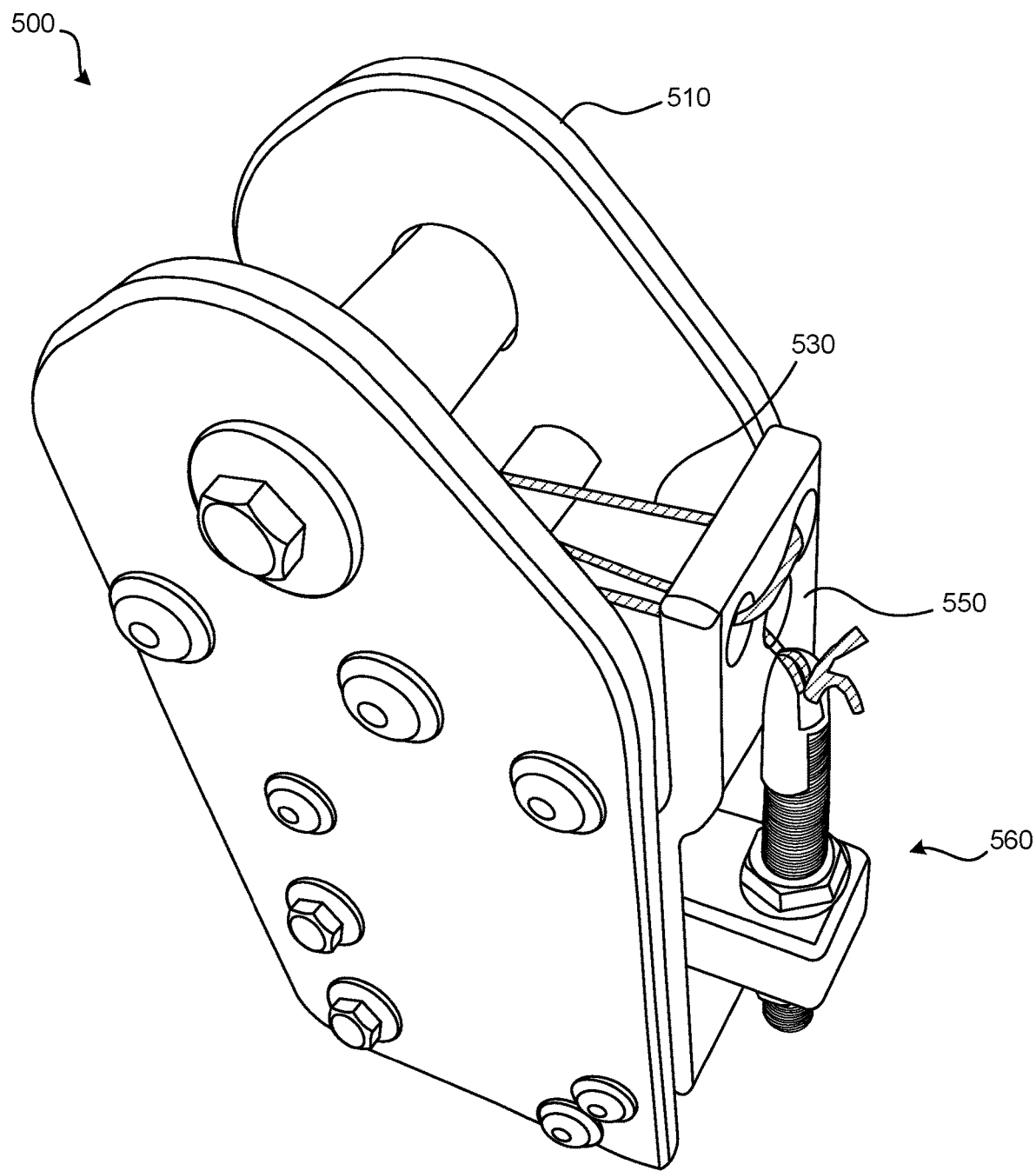
FIG. 5 is a perspective front view of a parachute release mechanism similar to that of FIG. 1C, except with the cord looped around the outer latch plate, in accordance with various embodiments.

In various embodiments, and with reference now to FIG. 5, a parachute release mechanism 500 is illustrated, in accordance with various embodiments. Parachute release mechanism 500 is similar to parachute release mechanism 100 of FIG. 1C, except that cord 530 is wrapped around outer latch plate 550 and looped back around an anchor point in housing 510 before being looped back to cord tensioner 560. In this manner, the load acting to secure outer latch plate 550 in a secured position is greater than the load acting on cord 530. Stated differently, because three different sections of cord 530 are pulling outer latch plate 550 toward the secured position, the force acting to secure outer latch plate 550 in the secured position is greater for a given tension in cord 530 than if only one section of cord 530 were acting on outer latch plate 550. In this manner, outer latch plate 550 may be configured to accommodate multiple sections of cord extending between the housing and the outer latch plate. Outer latch plate 550 may comprise a plurality of apertures (e.g., three separate apertures) for accommodating this wrapping of cord 530 through and/or around latch plate 550. In this manner, a plurality of sections (e.g., three sections) of the cord 530 may extend between the housing and the outer latch plate 550.

Figure 6A:
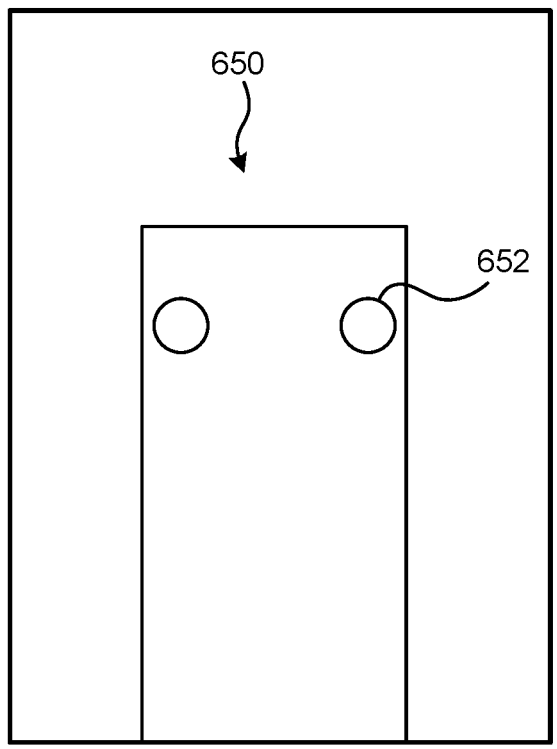
FIG. 6A is a front view of a free end of an outer latch plate comprises orifices for accommodating a cord, in accordance with various embodiments.
Figure 6B:
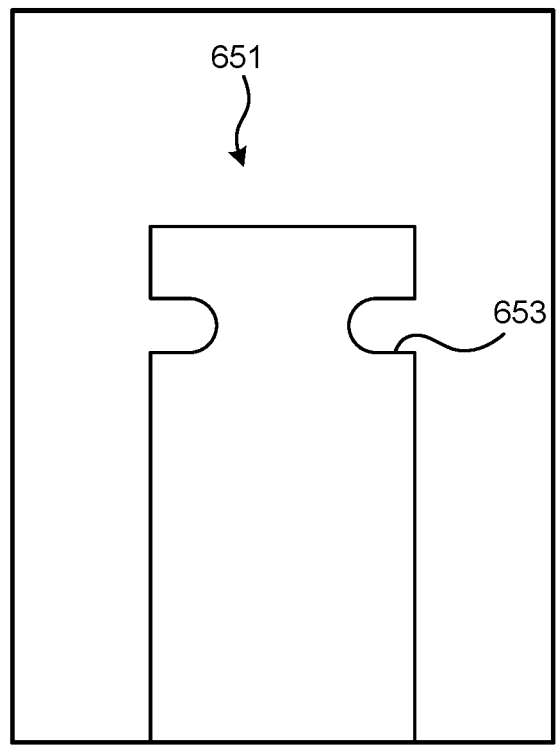
FIG. 6B is a front view of a free end of an outer latch plate comprises slots for accommodating a cord, in accordance with various embodiments.

In various embodiments, and with reference now to FIG. 6A and FIG. 6B, free ends of outer latch plates are illustrated with orifices and slots, respectively, for accommodating a cord. More particularly, and with particular focus on FIG. 6A, outer latch plate 650 is illustrated having two orifices 652 whereby cord 530, with momentary reference to FIG. 5, may pass through outer latch plate 650. With particular focus on FIG. 6B, outer latch plate 651 is illustrated having two slots 653 whereby cord 530, with momentary reference to FIG. 5, may pass around latch plate 651. It is further contemplated that the outer latch plate may include a combination of slots and orifices. It is further contemplate that the outer latch plate may include any number of slots and/or orifices for accommodating the cord. The number of slots/orifices may depend on the number of times the cord passes through and/or around the outer latch plate.

Figure 7:
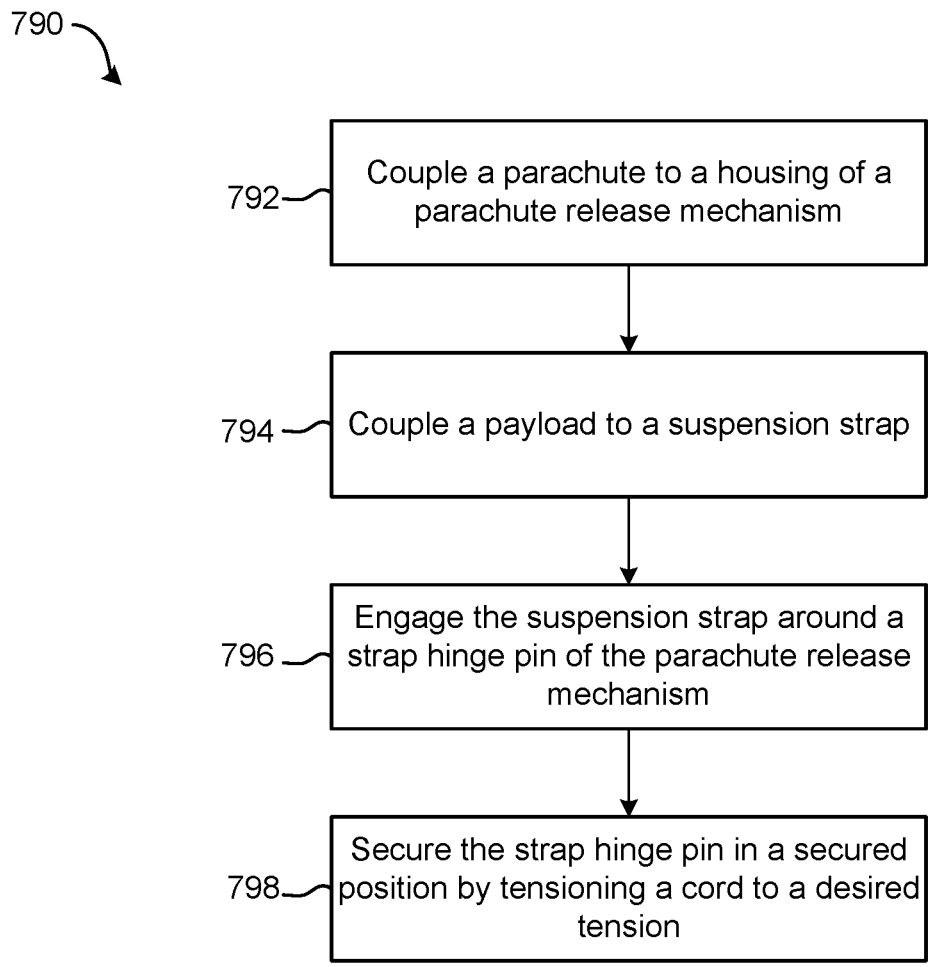
FIG. 7 is a schematic flow chart diagram of a method of connecting a parachute to a payload, in accordance with various embodiments.

In various embodiments, and with reference now to FIG. 7, a method 790 of connecting a parachute to a payload is provided. The method 790 may include coupling a parachute to a housing of a parachute release mechanism at step 792 and coupling a payload to a suspension strap at step 794. In various embodiments, the method 790 further includes engaging the suspension strap around a strap hinge pin of the parachute release mechanism at step 796 and securing the strap hinge pin in a secured position using a cord by tensioning the cord to a desired tension at step 798. In various embodiments, step 798 comprises routing the cord around and/or through at least one latch plate of the parachute release mechanism. Step 798 may comprise engaging a free end of the strap hinge pin against the at least one latch plate (e.g., inserting a tip of the strap hinge pin into a cavity/recess of an inner latch plate).

In some exemplary embodiments, a method of using a parachute release mechanism comprises: coupling a parachute to a parachute release mechanism; coupling a payload to the parachute release mechanism; tensioning a cord of the parachute release mechanism to apply a retaining force that prevents rotation of an inner latch plate and an outer latch plate of the parachute release mechanism; deploying the payload from an aircraft; deploying the parachute; and activating the parachute release mechanism by severing the cord to separate the parachute from the payload.

In various exemplary embodiments, parachute release mechanism 100 is configured to be compatible with a type V aerial delivery platform rated at up to 42,000 pounds payload capacity. Parachute release mechanism 100 may also be configured to be compatible with various other aerial delivery platforms and/or systems having higher and/or lower rated payload capacities, as desired. In various exemplary embodiments, parachute release mechanism 100 is configured with bolts having shear strength sufficient to enable parachute release mechanism 100 to be used with payloads of a desired weight without catastrophic failure. Parachute release mechanism 100 may thus be configured as appropriate for a particular payload weight, and then desirably coupled to various parachutes, risers, and/or suspension straps configured to support a particular payload weight.

In accordance with various exemplary embodiments, parachute release mechanism 100 is coupled to a parachute and to a payload. Once the parachute is deployed, parachute release mechanism 100 may be operated, for example, after a predetermined period of time, after the payload has reached a certain altitude, after the payload has reached a certain airspeed, and/or at any other suitable condition desired for operation of parachute release mechanism 100. Additionally, parachute release mechanism 100 may be configured for remote operation. For example, parachute release mechanism 100 may be configured with wireless communication components allowing a user to send an operative command, for example an activation command, to parachute release mechanism 100 and/or other components of parachute release system. For example, a reefing cutter, an explosive bolt, or other component of parachute release mechanism 100 may be triggered responsive to a command received at parachute release mechanism 100. In this manner, a user may monitor the descent of a payload, the inflation of a drogue parachute, the inflation of an intermediary parachute, and/or the like, and may trigger operation of parachute release mechanism 100 once a desired activation criterion has been achieved. Parachute release mechanism 100 may also be configured to activate after a predetermined time period (for example, 10 seconds) if an operative command has not been received. Parachute release mechanism 100 may further be configured to be activated responsive to any suitable condition, for example altitude of a payload, velocity of a payload, atmospheric pressure, temperature, and/or the like, as desired.

For example, due to the dynamic and somewhat chaotic conditions associated with opening of a parachute, operation of parachute mechanism 100 may suitably be accelerated, delayed, or otherwise modified and/or controlled. For example, operation of parachute release mechanism 100 may be delayed in order to allow a drogue parachute additional time to inflate, or in order to allow a payload to descend at a higher rate for an extended period of time, as desired. Additionally, operation of parachute release mechanism 100 may be accelerated, in order to allow a payload to descend into a revised location and/or at a lower rate of speed, or in order to expedite separation of a damaged and/or failed parachute from a payload.

Principles of the present disclosure may be utilized in connection with and/or may be complementary to or compatible with systems, methods, and/or principles disclosed in one or more of U.S. Pat. No. 8,083,184 entitled AERIAL DELIVERY SYSTEM; U.S. Pat. No. 8,096,509 entitled PARACHUTE INLET CONTROL SYSTEM AND METHOD; U.S. Pat. No. 8,186,624 entitled AERIAL DELIVERY SYSTEM; U.S. Pat. No. 8,210,479 entitled PARACHUTE INLET CONTROL SYSTEM AND METHOD; U.S. Pat. No. 8,313,063 entitled PARACHUTE RELEASE SYSTEM AND METHOD; U.S. Pat. No. 8,851,426 entitled ENHANCED CRUCIFORM PARACHUTE; U.S. Pat. No. 8,979,031 entitled AERIAL DELIVERY SYSTEM WITH MUNITION ADAPTER AND LOCKING RELEASE; U.S. Pat. No. 9,187,181 entitled PARACHUTE CANOPY INSERT; U.S. Pat. No. 9,399,514 entitled AERIAL DELIVERY SYSTEM WITH MUNITION ADAPTER AND LOCKING RELEASE; U.S. Pat. No. 9,452,842 entitled PARACHUTE CANOPY INSERT; U.S. Pat. No. 10,689,123 entitled PARACHUTE INLET CONTROL SYSTEM AND METHOD; or 10,723,468 entitled PARACHUTE INLET CONTROL SYSTEM AND METHOD, each to Fox. The contents of each of the foregoing are hereby incorporated by reference in their entirety (except for any subject matter disclaimers or disavowals, and except to the extent of any conflict with the disclosure of the present application, in which case the disclosure of the present application shall control).

Accordingly, parachute release mechanism 100 may include a controller configured to facilitate operation of the release of the payload. In various embodiments, the controller may be integrated into computer systems or the controller may be a standalone controller. In various embodiments, the controller comprises a processor. In various embodiments, the controller is implemented in a single processor. In various embodiments, the controller may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Furthermore, any number of conventional techniques for electronics configuration, signal processing and/or control, data processing and the like may be employed. Also, the processes, functions, and instructions may can include software routines in conjunction with processors, etc.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase "means for."

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

All ranges and ratio limits disclosed herein may be combined. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Different cross-hatching may be used throughout the figures to denote different parts but not necessarily to denote the same or different materials. Surface shading lines may be used throughout the figures to denote different parts or areas but not necessarily to denote the same or different materials. In some cases, reference coordinates may be specific to each figure. Furthermore, the connecting lines shown in the various figures contained herein are intended to represent exemplary functional relationships and/or physical couplings between the various elements. It should be noted that many alternative or additional functional relationships or physical connections may be present in a practical system.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The schematic flow chart diagrams included herein are generally set forth as logical flow chart diagrams. As such, the depicted order and labeled steps are indicative of one or more embodiments of the presented method. The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A parachute release mechanism, comprising:
a housing;
a strap hinge pin pivotably mounted to the housing, the strap hinge pin pivotable between a secured position and a released position, wherein in the secured position the strap hinge pin is configured to support a suspension strap for a payload and in the released position the suspension strap is enabled to disengage from the strap hinge pin;
a cord coupled to the housing, the cord configured to retain the strap hinge pin in the secured position; and
a cord tensioner coupled to the cord,
wherein the cord tensioner is configured to impart a desired tension to the cord, and wherein the cord tensioner comprises:
a draw block;
a tensioning screw extending through the draw block to which the cord is attached; and
a pair of nuts threadably engaged on the tensioning screw on opposite sides of the draw block.

2. The parachute release mechanism of claim 1, further comprising a latch plate pivotably mounted to the housing.

3. The parachute release mechanism of claim 2, wherein the cord tensioner is coupled to the housing or is coupled to the outer latch plate.

4. The parachute release mechanism of claim 3, wherein the pair of nuts comprises a tensioning nut on a bottom side of the draw block and a lock nut on a top side of the draw block.

5. The parachute release mechanism of claim 4, wherein the tensioning nut is configured to be rotated relative to the tensioning screw to tension the cord and the lock nut is configured to secure the tensioning screw in response to the desired tension being imparted to the cord.

6. The parachute release mechanism of claim 1, wherein the cord is configured to be severed by a cord cutting device, and wherein in response to the cord being severed the strap hinge pin is configured to transition from the secured position to the released position.

7. The parachute release mechanism of claim 6, further comprising the cord cutting device mounted to the housing.

8. The parachute release mechanism of claim 2, wherein the cord is configured to at least one of extend around and extend through the latch plate to restrict pivoting movement of the latch plate, thereby securing the strap hinge pin in the secured position.

9. The parachute release mechanism of claim 8, wherein the latch plate is an outer latch plate and the release mechanism further comprises an inner latch plate pivotably mounted to the housing against which a free end of the strap hinge pin is engaged in the secured position.

10. The parachute release mechanism of claim 9, wherein the cord extends through an aperture defined in a free end of the outer latch plate.

11. A parachute release mechanism, comprising:
a housing;
a strap hinge pin pivotably mounted to the housing, the strap hinge pin pivotable between a secured position and a released position, wherein in the secured position the strap hinge pin is configured to support a suspension strap for a payload and in the released position the suspension strap is enabled to disengage from the strap hinge pin;
a cord coupled to the housing, the cord configured to retain the strap hinge pin in the secured position; and a cord tensioner coupled to the cord, wherein the cord tensioner is configured to impart a desired tension to the cord, and wherein the cord tensioner comprises a turnbuckle assembly.

12. The parachute release mechanism of claim 11, further comprising a latch plate pivotably mounted to the housing.

13. The parachute release mechanism of claim 12, wherein the cord tensioner is coupled to the housing or is coupled to the outer latch plate.

14. The parachute release mechanism of claim 12, wherein the cord is configured to be severed by a cord cutting device, and wherein in response to the cord being severed the strap hinge pin is configured to transition from the secured position to the released position.

15. The parachute release mechanism of claim 14, further comprising the cord cutting device mounted to the housing.

16. The parachute release mechanism of claim 15, wherein the cord is configured to at least one of extend around and extend through the latch plate to restrict pivoting movement of the latch plate, thereby securing the strap hinge pin in the secured position.

17. The parachute release mechanism of claim 16, wherein the latch plate is an outer latch plate and the release mechanism further comprises an inner latch plate pivotably mounted to the housing against which a free end of the strap hinge pin is engaged in the secured position.

18. The parachute release mechanism of claim 17, wherein the cord extends through an aperture defined in a free end of the outer latch plate.

19. A parachute release mechanism, comprising:
 a housing;
 a strap hinge pin pivotably mounted to the housing, the strap hinge pin pivotable between a secured position and a released position, wherein in the secured position the strap hinge pin is configured to support a suspension strap for a payload and in the released position the suspension strap is enabled to disengage from the strap hinge pin;
 a cord coupled to the housing, the cord configured to retain the strap hinge pin in the secured position; and
 a cord tensioner coupled to the cord, wherein the cord tensioner is configured to impart a desired tension to the cord, and wherein the cord tensioner comprises a capstan winch coupled to the housing.

\* \* \* \* \*